United States Patent [19]

Allsop et al.

[11] Patent Number: 4,787,024

[45] Date of Patent: Nov. 22, 1988

[54] INTERFACE SYSTEM FOR SIMULATED DISPLAY INSTRUMENTS IN A VEHICLE SIMULATOR

[75] Inventors: Derek P. Allsop, Woking; Lawrence C. Marini, Worthing, both of Great Britain

[73] Assignee: The Singer Company, Binghamton, N.Y.

[21] Appl. No.: 890,207

[22] Filed: Jul. 28, 1986

[51] Int. Cl.[4] .......................... G06F 15/20; G09B 9/08
[52] U.S. Cl. .................... 364/132; 364/138; 364/578; 434/30; 434/49
[58] Field of Search .............. 364/131–135, 364/138, 139, 578, 200 MS File, 900 MS File; 340/825.06, 825.07, 310 R, 310 A; 434/29, 30, 49–54

[56] References Cited

U.S. PATENT DOCUMENTS

| | | | |
|---|---|---|---|
| 4,118,772 | 10/1978 | Takada | 364/138 |
| 4,167,821 | 9/1979 | Gibson, Jr. et al. | 364/578 X |
| 4,209,832 | 6/1980 | Gilham et al. | 364/900 X |
| 4,280,285 | 7/1981 | Haas | 434/30 |
| 4,424,559 | 1/1984 | Lorincz et al. | 364/138 X |
| 4,456,994 | 6/1984 | Segarra | 364/200 X |
| 4,467,412 | 8/1984 | Hoff | 364/200 |
| 4,530,045 | 7/1985 | Petroff | 364/138 |
| 4,628,437 | 12/1986 | Poschmann et al. | 364/138 X |

Primary Examiner—Joseph Ruggiero
Attorney, Agent, or Firm—Barry L. Haley

[57] ABSTRACT

A flight simulator includes a host computer 10 coupled to serial buses 13 by master-interface circuits 12, each of which is a serial bus master controller. Each bus 13 is coupled to a number of slave circuits 14, and each slave circuit 14 drives several instrument display devices 15. The slave circuits 14 contain slave bus controllers and digital to analog conversion circuits for developing the drive signals for the display devices 15. Each slave bus controller is provided with one or more programs for processing received serial data in accordance with the electro-mechanical characteristics of the driven display device 15. Analog feedback signals may be provided by the devices 15 and A-D converted in the respective slave circuits 14 before transmission as serial data to the host computer 10 via the buses 13 and master-interfaces 12.

2 Claims, 8 Drawing Sheets

MOVING COIL

DC SYNCHRO

DC SERVO

CONSTANT SPEED DRIVE

SINE/COSINE SERVO

DUAL-SPEED SERVO

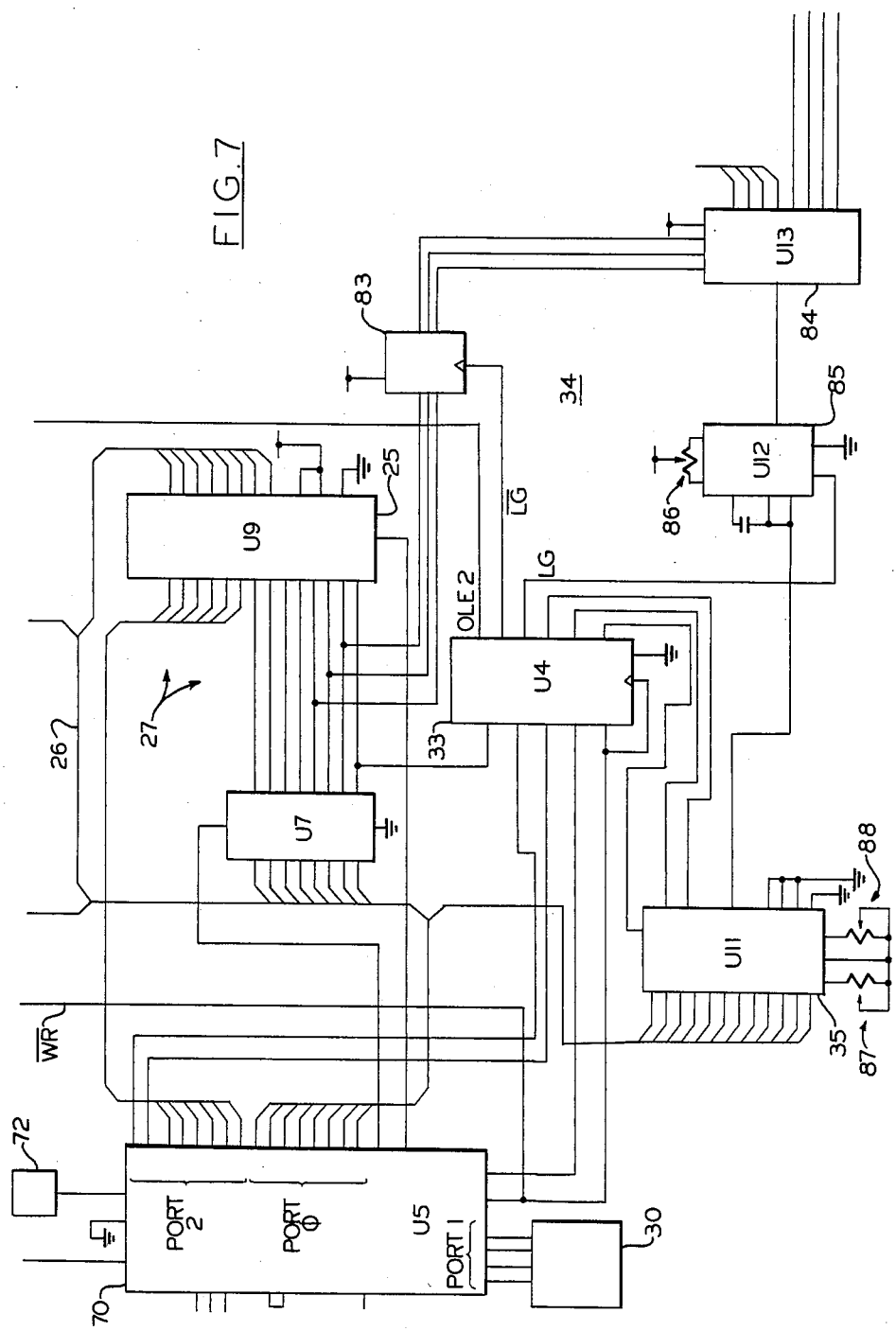

INTERFACE SYSTEM FOR SIMULATED DISPLAY INSTRUMENTS IN A VEHICLE SIMULATOR

This invention relates to an interface system for display instruments, and especially, but not exclusively, to interface systems for display instruments in vehicle simulators such as flight simulators.

The use of real aircraft instruments in flight simulators presents a number of problems, for example, they are a.c. driven, fragile and very expensive. Whilst the introduction of simulated instruments which have been designed without the rigid constraints that apply to aircraft instruments has overcome many of these problems, that of connecting the instruments to the Simulator Computer still exists. Normally, linkage PCBs containing digital to analog conversion and discrete inputs and outputs are used. A typical military simulator may contain on average two hundred Linkage PCBs, and of these, approximately thirty are required to drive the simulated instruments. For the ease of packaging and maintenance these cards (PCBs) are normally housed in large racks each containing say three card-bins with each card-bin having the potential to house seventeen PCBs, for example. The racks are normally sited around the outside of the simulator, and consequently there is a considerable distance between the Linkage cards and the instruments themselves. This therefore creates the need for both long cables, which can number one hundred and forty on a typical simulator, and distribution points.

Part of a typical flight simulator installation is illustrated in FIG. 1 of the accompanying drawings.

Due to varying instrument dial presentations unique software driver modules are required. The purpose of these modules is to retrieve relevant data from the simulator's aircraft performance software module(s), and suitably format it for the particular instrument. These driver modules form a significant computing load on the Simulator Computer.

In accordance with the present invention it is proposed to replace such known arrangements and to provide instead master-slave serial bus systems associated with aircraft performance software modules to interface between a simulator computer and simulated instruments.

For example, an object of the invention is to provide a digital serial bus network which will allow all the simulated intruments found in a military simulator to be driven by one or other or a number of serial buses.

Preferably, dedicated hardware formerly included on linkage cards is, in accordance with the invention, incorporated in instrument driver modules which are slaves in the bus network. Furthermore, by using a suitable microcontroller system in each instrument driver module, the unique software module for the type of instrument driven can be incorporated in a common hardware design of instrument driver module.

Using a preferred serial bus system which is baed on HDLC/SDLC protocol and employs InteL RUPI-44 microcontrollers, up to twenty-seven instrument modules can be driven on one serial bus.

The invention will now be described in more detail by way of example with reference to the accompanying drawings in which.

Figure 3:
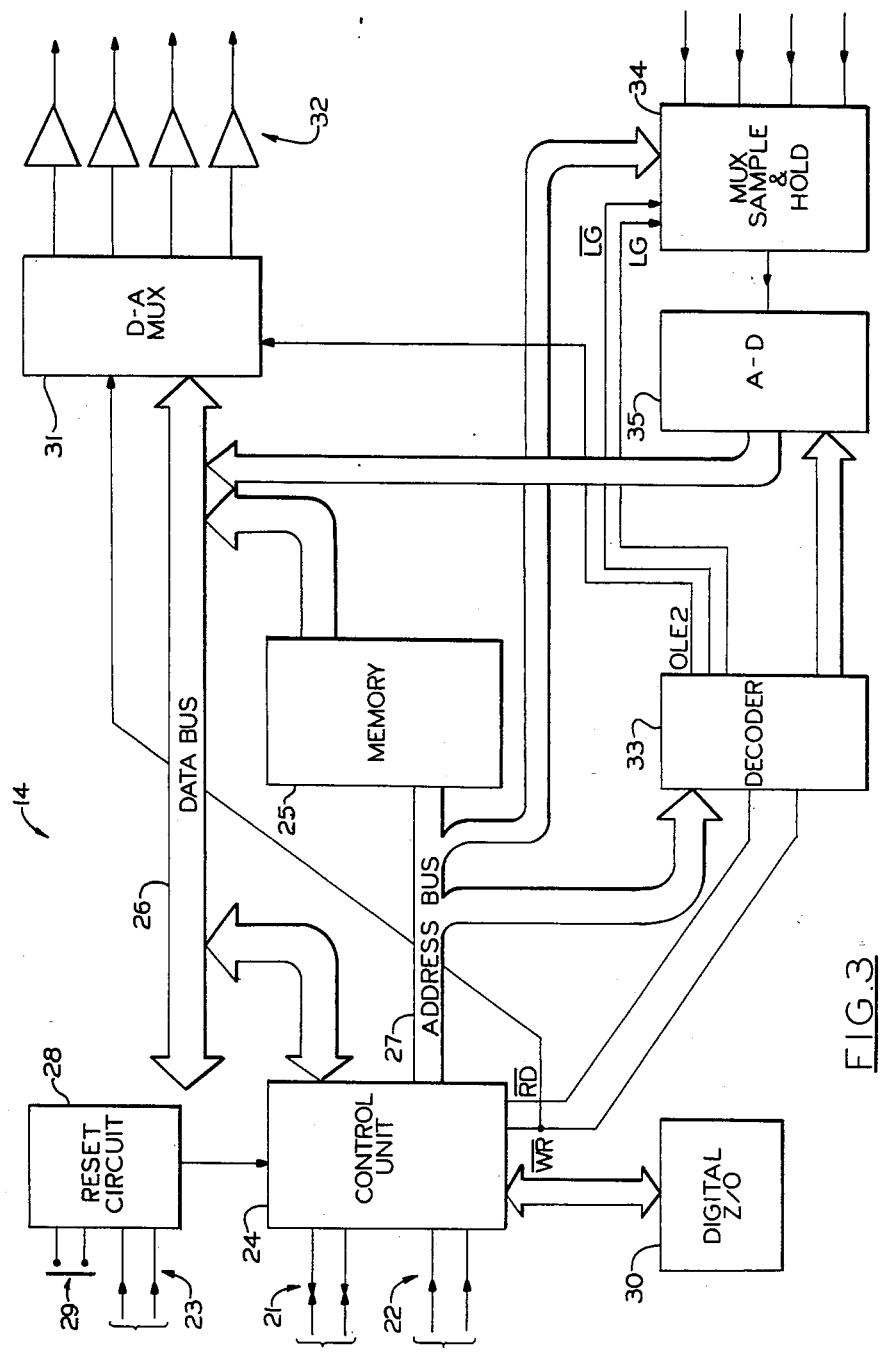
FIG. 3 is a block diagram of an instrument driver module to be operated as a slave in the system of FIG. 2A.
Figure 4A:
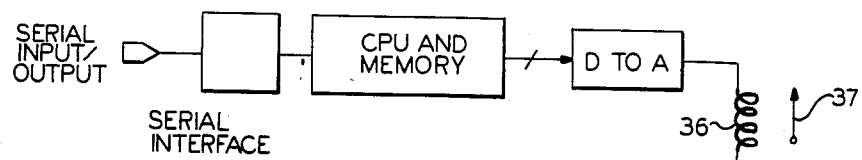
Figure 4B:
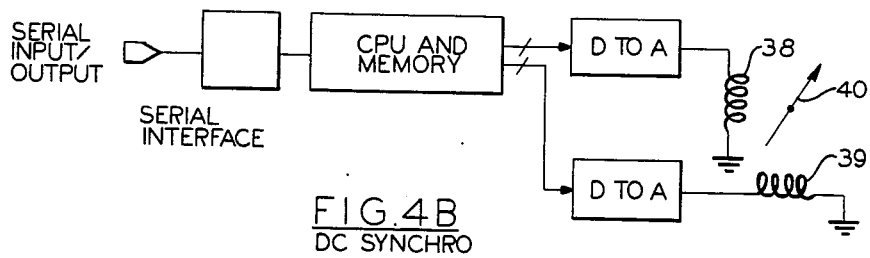
Figure 4C:
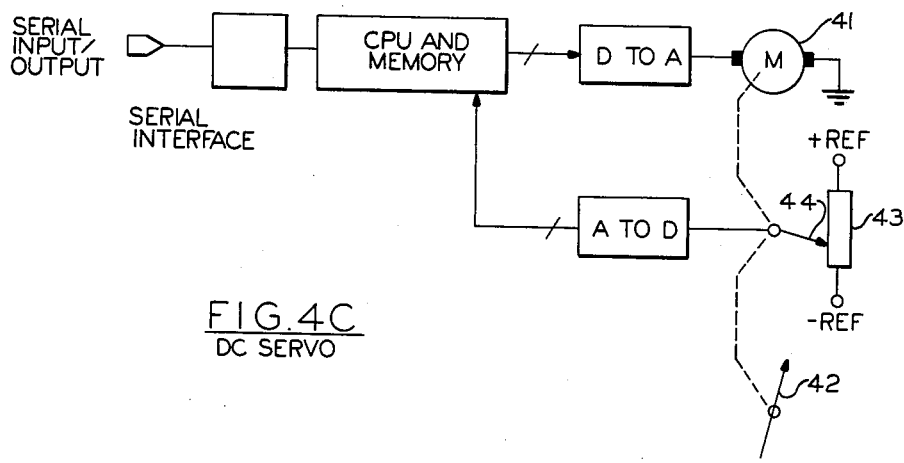
Figure 4F:
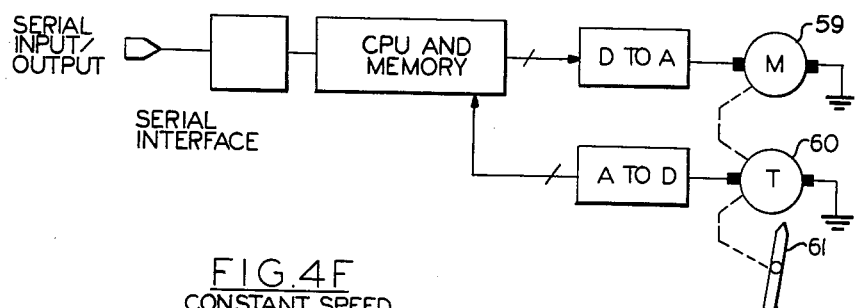
Figure 4D:
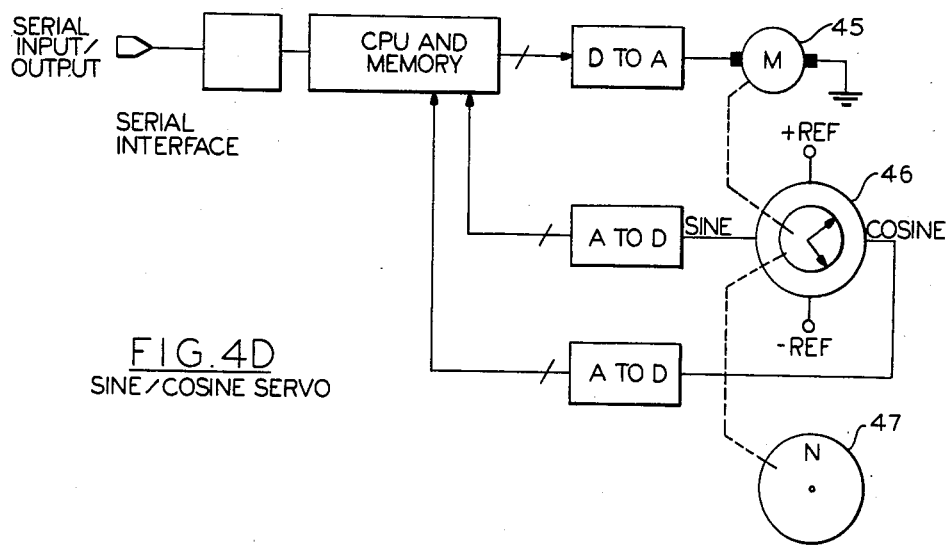
Figure 4E:
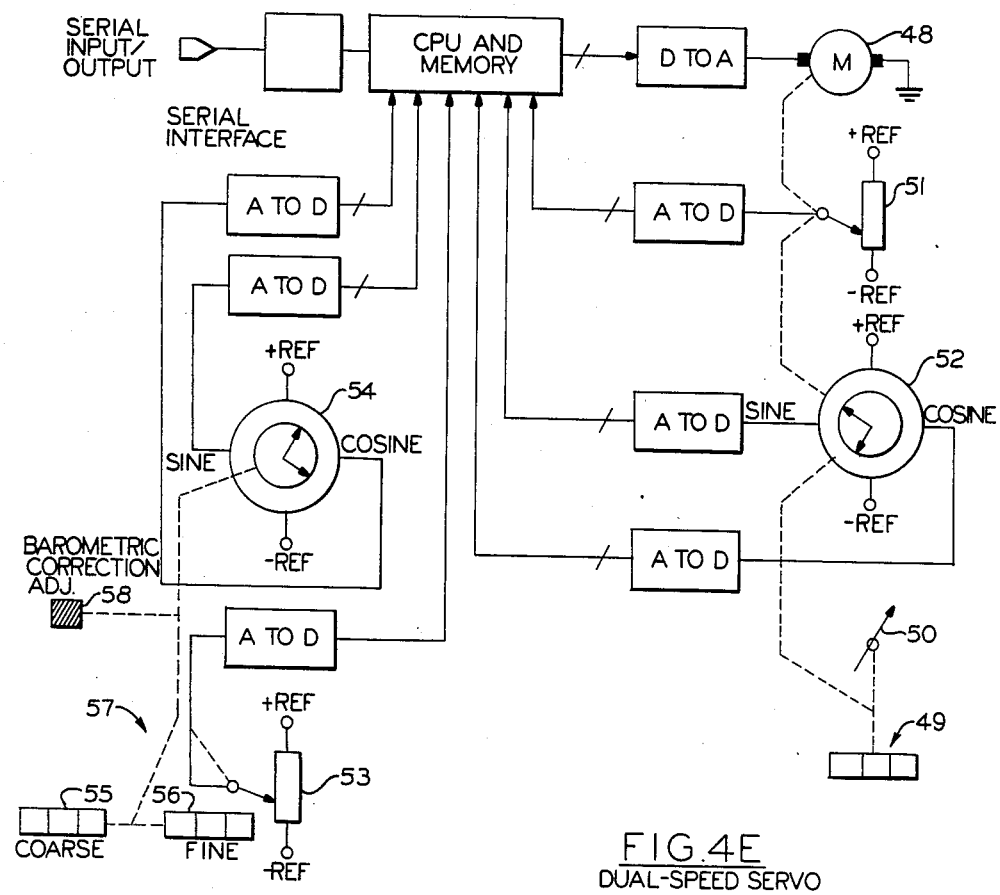
Figure 5:
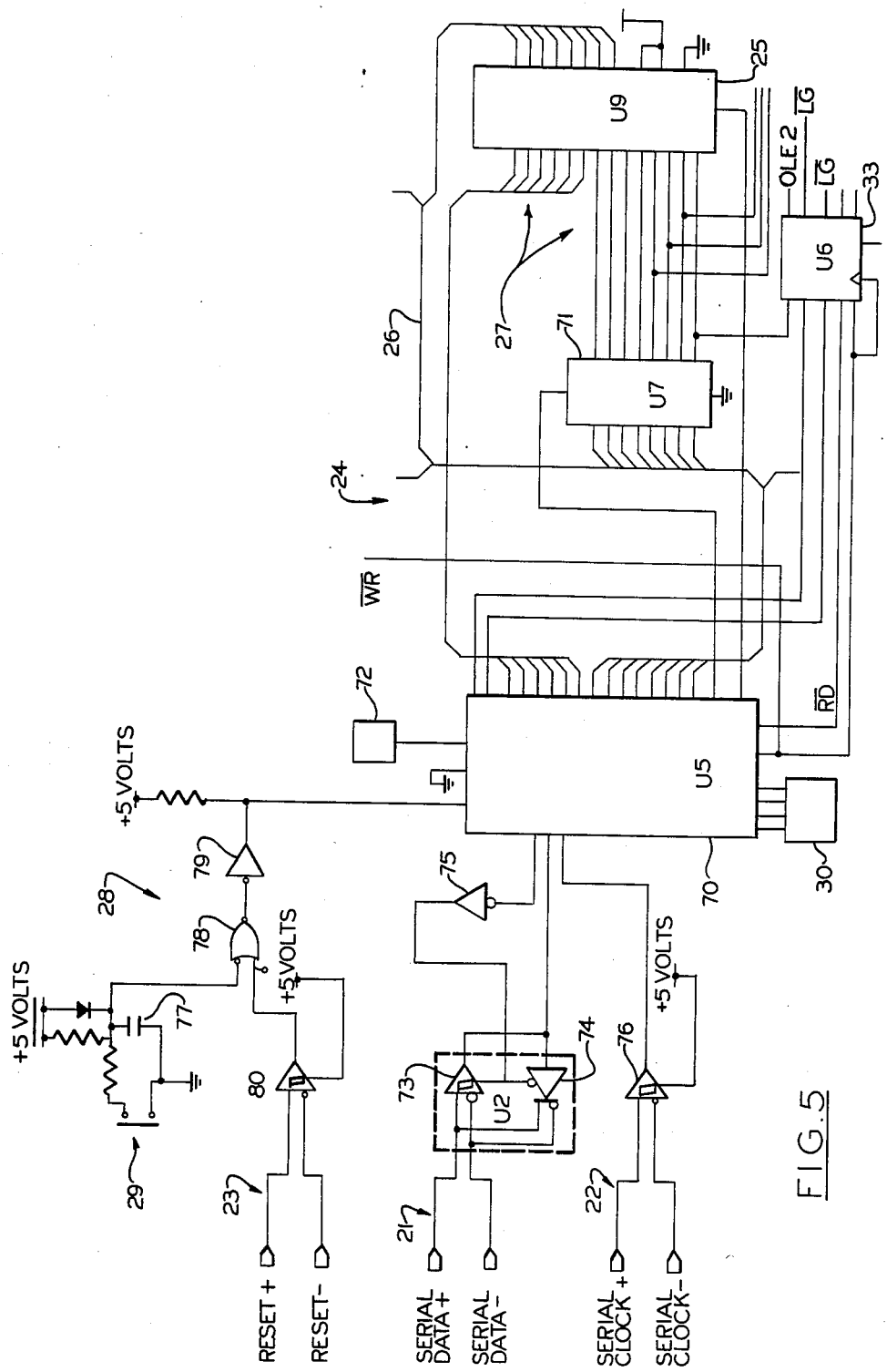
Figure 6:
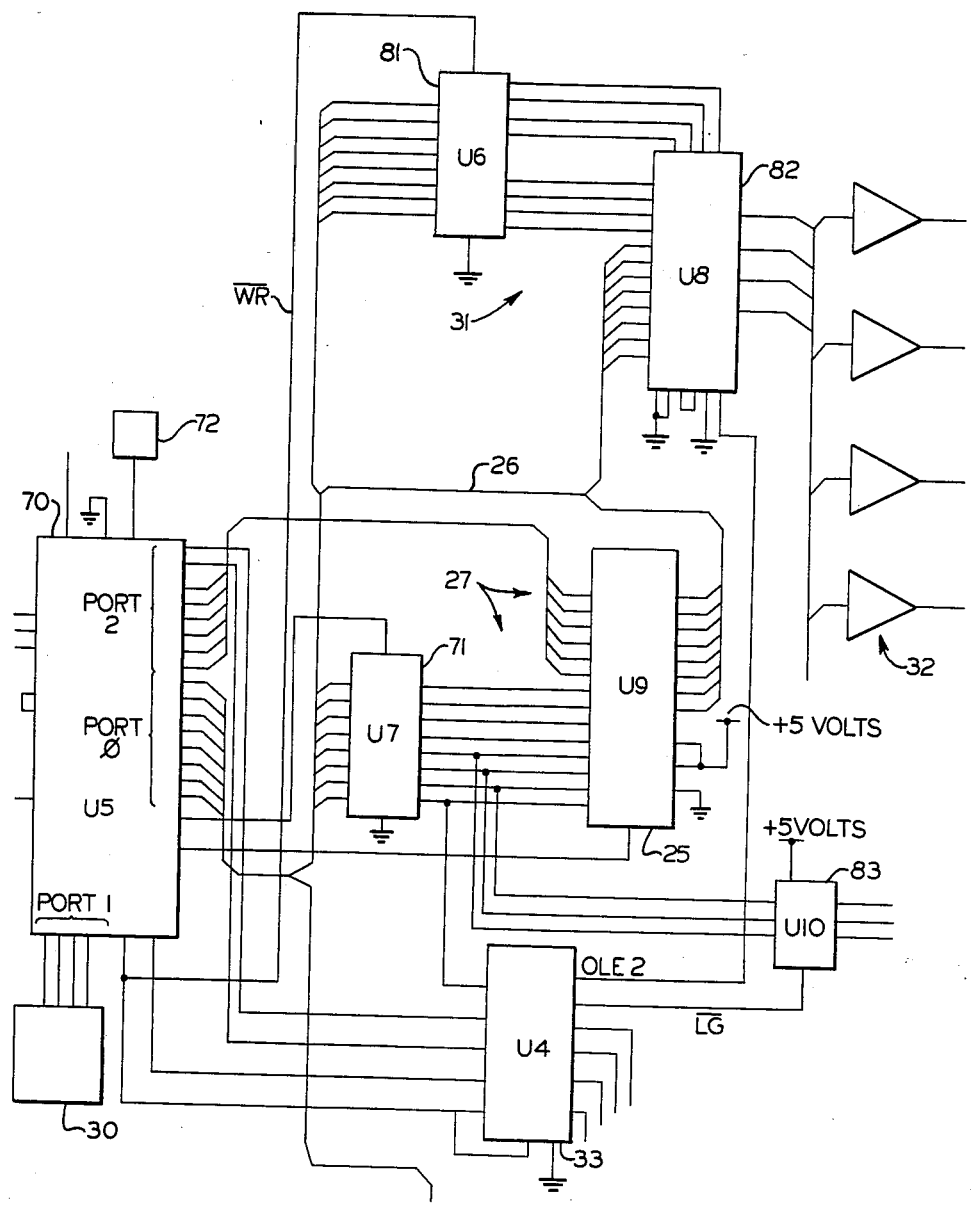

FIGS. 4(a) to 4(f) are schematic representations of functional elements involved in driving particular types of electromechanical instrument displays; and FIGS. 5, 6 and 7 are circuit diagrams showing integrated circuit components and their interconnections in the instrument driver module of FIG. 3.

Figure 1:
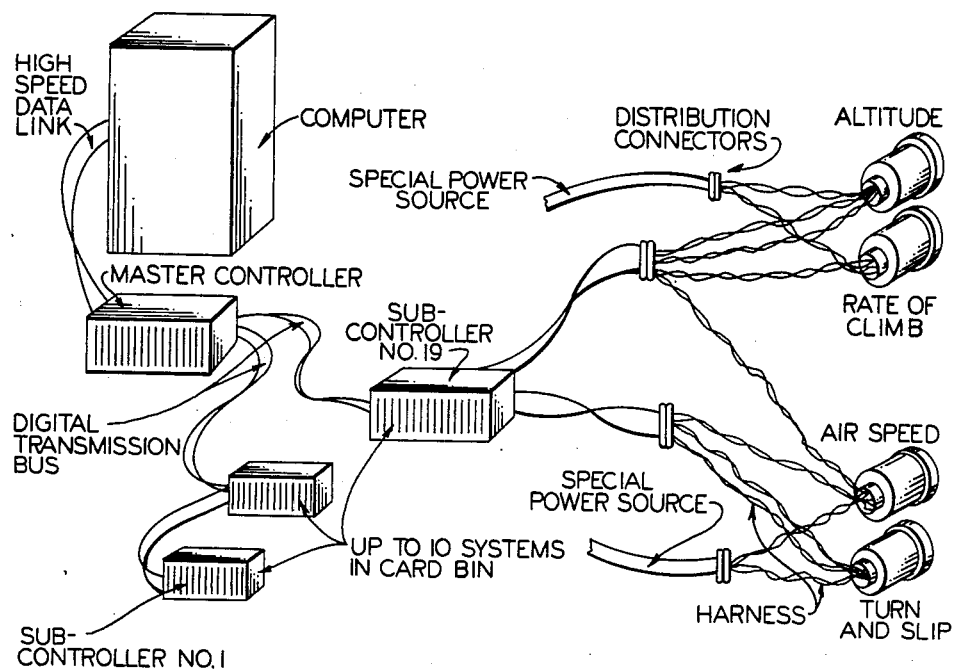
FIG. 1 is an illustration of part of a typical flight simulator installation.
Figure 2B:
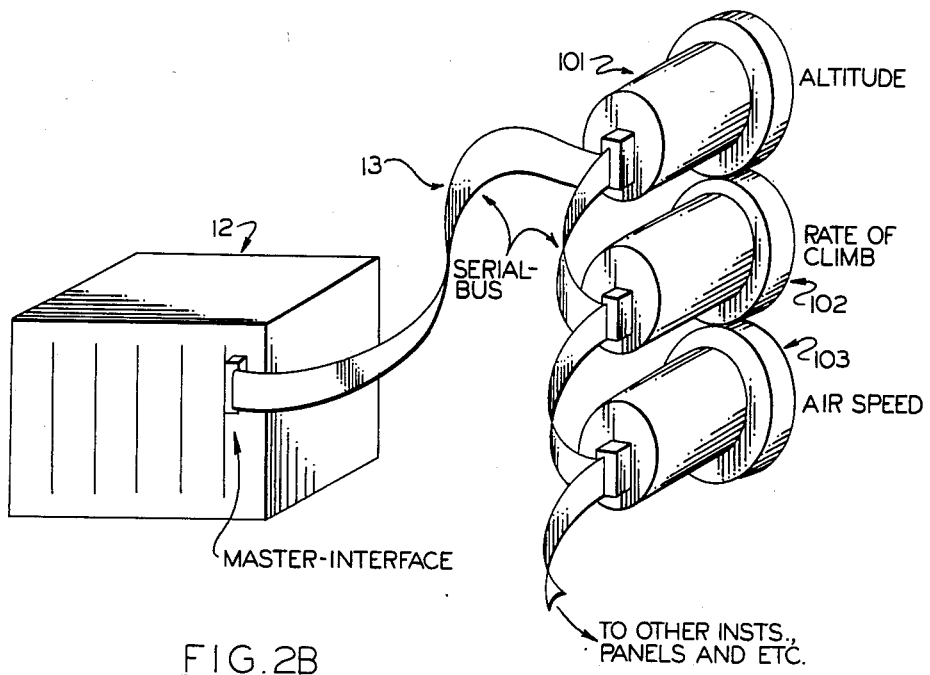
FIG. 2B is a perspective illustration of part of the system of FIG. 2A.
Figure 2A:
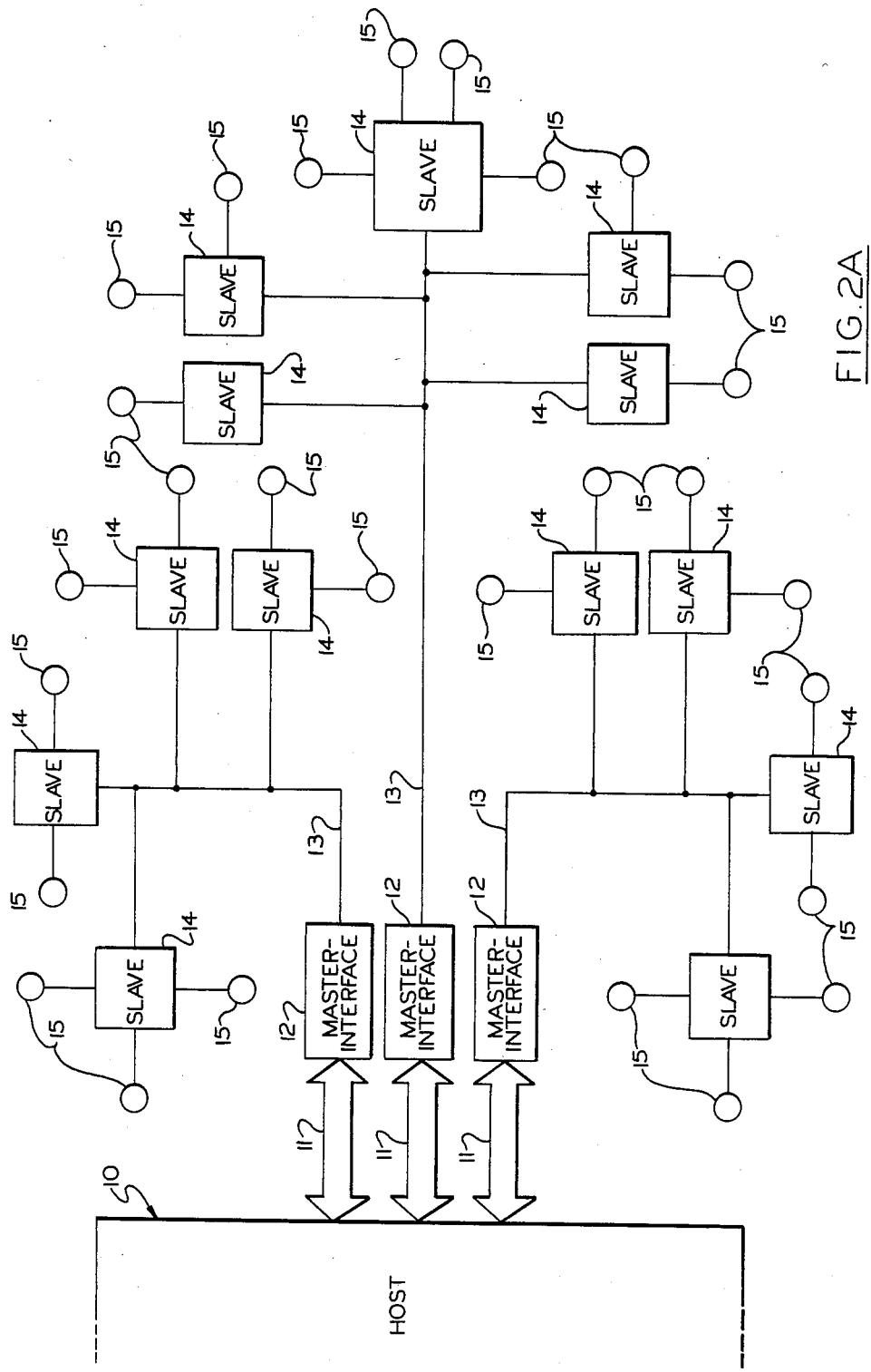
FIG. 2A is a schematic representation of an interface system using serial buses between a flight simulator host computer and a plurality of instrument display drives.

FIG. 2A shows an embodiment of the invention forming part of a flight simulator system. The flight simulator system has a host computer 10 that carries out real time computation of a simulated flight path, aircraft engines and systems behaviour during the simulated flight, data to be displayed by instruments representing the aircraft's instruments and motion commands for a simulator platform (not shown). Such features of flight simulator systems are well known to those skilled in the art. The data to be displayed is transmitted over short parallel data buses 11 to respective master-interfaces 12. Each master-interface 12 has a buffer memory for storing parallel data, a microprocessor for reading the buffer memory and loading a small FIFO store from the buffer memory, and for transferring bytes from the FIFO to the buffer memory, and a serial bus controller, such as an Intel 8744, for transferring data between the FIFO and a respective serial bus 13, and operating as bus master in relation to the respective serial bus 13.

Each serial bus 13 connects the respective master-interface 12 to a number of slave circuits 14 each driving and receiving feedback from a number of electromechanical indicators 15. The slave circuits 14 convert serial data from the buses 13 into analog drive signals for the indicators 15, and convert analog feedback signals from the indicators 15 into serial data for the buses 13. Each slave circuit 14 may also directly control and receive status signals from digital devices (not shown) such as solenoids, relays, lamps and switches.

FIG. 2B shows in simplified respective one of the master-interfaces 12 connected to three instruments 101, 102, 103 by the respective serial bus 13. In this example, each of the instruments 101, 102 and 103 has within its case a slave circuit 13 and an electromechanical indicator 15 driven by the slave circuit 13. The electromechanical indicators 101, 102 and 103 are represented as being for altitude, ratee of climb and air speed, respectively. Other instruments and display panels may be connected to the serial bus 13.

FIG. 3 represents in block form one of the slave circuits 14 of FIG. 2A. The respective serial bus 13 has three twisted pairs of conductors, a first pair 21 carrying serial data, a second pair 22 carrying a serial clock signal generated by the respective master-interface 12, and a third pair 23 for reset signals generated by the master-interface 12. The serial data and serial clock conductors 21 and 22 are connected to a control unit 24 which operates in accordance with a program held in a memory 25 to which it is connected by a data bus 26 and an address bus 27.

The reset signal conductors 23 are connected to a reset circuit 28 which supplies a reset signal to the control unit 24 in response to receiving a reset signal on the conductors 23 or to momentary closure of a manual reset switch 29 connected to the circuit 28. The reset circuit 28 also generates a reset signal for the control unit 24 at power up.

The control unit 24 includes a microcontroller which receives the serial data and serial clock signals from the bus 13 and converts such data into parallel data for a digital input/output unit 30 that controls solenoids, relays and lamps (not shown), and for a digital-to-analog converter and multiplexer 31 coupled through amplifiers 32 to four electrochemical indicator drives (not shown). The solenoids, relays and lamps controlled by the unit 30 may be associated with the electromechanical indicator drives.

The digital-to-analogue converter and multiplexer 31 is controlled by a low active WRITE signal $\overline{WR}$ output by the control unit 24, and an enabling signal OLE2 from a decoder 33 which receives as input, the low active WRITE signals $\overline{WR}$, a low active READ signal $\overline{RD}$, and address bus signals from the control unit 24.

Each of the four electromechanical indicator drives is associated with a feedback element that supplies a feedback signal to a multiplexer and sample-and-hold circuit 34. The sampled analog feedback signal is supplied by the circuit 34 to an analog-to-digital converter 35 having its digital output coupled to the data bus 26. Selection of an analog feedback signal for sampling is effected by means of address signals supplied to the multiplexer part of the circuit 34 from the address bus 27 and an output signal $\overline{LG}$ from the decoder 33. Operation of the sample-and-hold part of the circuit 34 is controlled by an output LG from the decoder 33. Three further output signals from the decoder 33 are used to control operation of the analog-to-digital converter 35.

FIG. 4 shows six different electromechanical indicator drives with various feedback devices and with functional blocks representing the functions effected by a slave circuit 14 such as the circuit of FIG. 3 when used to control or receive feedback from the ddrive represented.

In FIG. 4(a) a moving coil indicator drive is represented having a drive coil 36 driving a pointer 37. Serial input from the respective serial bus 13 is converted into parallel data by a serial interface, and the data is converted to analog form under the control of a CPU and memory system.

FIG. 4(b) represents a DC Synchro drive having orthogonal drive coils 38 and 39 driving a pointer 40. Separate digital to analog conversions are required for the coils 38 and 39.

FIG. 4(c) represents a DC Servo drive having a DC servo motor 41 driving a pointer 42 the position of which is sensed by a potentiometer 43 which provides a feedback signal at its wiper contact 44. A digital to analog conversion is required for the input to the motor 41, and an analog to digital conversion is required for the analog signal at the wiper contact 44.

FIG. 4(d) represents a sine/cosine servo drive having a DC servo motor 45, a sine/cosine potentiometer 46 driven by the motor 45, and a display disc 47 driven by the motor 45. One digital to analog conversion is required for driving the motor 45, and two analog to digital conversions for the sine and cosine outputs of the potentiometer 46.

FIG. 4(e) represents a dual-speed servo drive having a DC servo motor 48 that drives a mechanical digital display 49 and an indicator pointer 50 geared so that the digital display 49 displays aircraft height, for example, to the nearest 1000 feet, and the pointer 50 indicates aircraft height to the nearest 10 feet. A ten-turn potentiometer 51 is coupled to the display 49 to provide an analog feedback signal representing the state of this display, and a sine/cosine potentiometer 52 is coupled to the pointer 50 to provide feedback signals representing the position of the needle 50. Feedback signals are also provided by a ten-turn potentiometer 53 and a sine/cosine potentiometer 54 coupled respectively to coarse and fine indicators 55 and 56 of a barometric correction setting mechanism 57, having a manually operable knob 58. One digital to analog conversion is required for the motor 48, and six analog to digital conversions for the sine/cosine potentiometers 52 and 54, and the ten-turn potentiometers 51 and 53.

FIG. 4(f) represents a constant-speed drive having a DC motor 59 driving a tachometer 60 and a pointer 61. One digital to analog conversion is required for the motor 59, and one analog to digital conversion for the tachometer 60.

The Moving Coil drive type is used where both accuracy and a turning angle of greater than 270° are not required. The coil is referenced to $-10$ volts, so that any fault occurring on the signal input does not cause the coil to be driven with a negative potential.

The DC synchro drive is used where accuracy need only be $+/-2°$ and a high torque is not required, and has one advantage over the Moving Coil drive in that it has an unlimited turning angle, and can rotate in each direction ad infinitum. The rotor rotates, following a magnetic field set up by stator windings, and only stops rotating when the stator magnetic field also becomes stationary. With the stator windings wired at 90° electrically to each other, the following table indicates the voltages that need to be applied to the two windings to obtain the required angle of rotation.

| Angle ($\theta$) (degrees) | Winding A | Winding B (volts) |
| --- | --- | --- |
| 0 | 0 | +10 |
| 45 | +7.071 | +7.071 |
| 90 | +10 | 0 |
| 135 | +7.071 | −7.071 |
| $\theta$ | 10.sin $\theta$ | 10.cos $\theta$ |

Winding 38 is known as the 'sine' winding and winding 39 as the 'cosine'.

The DC Servo is used in single pointer instruments of typically up to 2" in diameter. The DC Servo, as with the Moving Coil drive type, operates over a limited turning angle but, in contrast to the Moving Coil drive, it has a greater accuracy typically 0.5% and develops high torque.

The DC Servo works on the principle of summing the 'required position' input voltage and the 'actual position' feedback voltage, until zero.

Working on a similar principle to the DC Servo, the Sine/Cosine Servo has the following advantages over that of the DC Servo:
  (a) Higher torque developed
  (b) Unlimited turning angle (as with the DC Synchro)
  (c) Greater degree of accuracy.

Due to its unlimited turning angle the Sine/Cosine Servo is used in instruments such as compasses and gyros, instruments where relatively heavy discs and drums need to be rotated with a high degree of accuracy.

The Dual-Speed Servo drive type is basically the combination of a DC Servo circuit, which provides a means to drive the indicator quickly, and a Sine/Cosine Servo, which allows the indicator to be controlled to a very high degree of accuracy. The drive consists of a coarse drive and fine drive. An application for such a drive type occurs in altimeter instruments, where a further stage must be included to account for barometric pressure. This stage offsets the inputs to the instrument in proportion to the barometric pressure setting.

Constant-Speed Drives work on the same principle as the DC Servo, but instead of a position feedback, a speed feedback is required. Obtained by mechanically coupling a tacho, both the "required speed" and "actual speed" voltages are summed together. When the servo motor is rotating at the required rate, this sum becomes zero, causing the DC motor and hence the tacho to slow down. At this point the voltage sum no longer equals zero, resulting in a potential difference being applied across the DC motor, causing it to speed back up.

FIG. 5 shows an example of circuitry making up the control unit 24, the reset circuit 28 and the memory 25, together with the digital input/output unit 30 and the decoder 33. The control unit 24 includes a microcontroller 70, which in this example is an Intel 8744, a latch circuit 71, such as a 74 ALS 573 circuit, and a crystal oscillator 72 supplying clock pulses to the microcontroller 70, at 12 MHz for the 8744. Incoming serial data is applied to a differential amplifier 73 and outgoing serial data is coupled to the data conductors 21 by a differential output amplifier 74, the two amplifiers 73 and 74 being operated in a complementary manner by an enabling signal applied through an inverter 75 from a data enabling output of the microcontroller 70, which is pin 10 on the 8744, data in and out being at pin 11. Serial clock signals on the conductors 22 are applied to another differential amplifier 76 having its output connected to the serial clock input pin, pin 15, of the microcontroller 70.

The reset circuit 28 has a capacitor 77 arranged to be charged when power is supplied and coupled through an OR gate 78 and an inverter 79 to the reset pin of the microcontroller 70, so that the microcontroller is reset at power up. The manual reset switch 29 is connected to apply substantially a short circuit across the capacitor 77 when closed. Reset signals on the reset conductors 23 are coupled through a differential amplifier 80 to the other input of the OR gate 78.

The memory 25 is an EPROM, type 2764-2 having a fourteen bit address input connected to the address bus 27, an eight bit data output connected to the data bus 26, and a chip enable input OE supplied by a program store enable output PSEN of the microcontroller 70. Pins 1 and 27 of the 2764-2 are both connected to a +5 volts supply, and pin 20 is connected to ground.

The address bus 27 is supplied by eight outputs of the latch 71 and six outputs of an address output port, port 2, of the microcontroller 70. The input to the latch 71 is supplied by the eight outputs of a quasi bi-directional data output port, port $\phi$, of the microcontroller 70, and is controlled by a latch enable output ALE from a pin 30 of the microcontroller 70. The outputs of port $\phi$ are also supplied to the data bus 26 which is an eight bit bus. The two most significant bis, AD14 and AD15, of port 2, are connected to two inputs of the decoder 35 which in this example is a programmed array logic, type PAL 20X4. The least significant bit A $\phi$ of the address bus 27 is also supplied to the decoder 35, the remaining two inputs being the write and read commands $\overline{WR}$ and $\overline{RD}$, of which the write command $\overline{WR}$ is also used as a clock signal to the decoder.

The digital input/output unit 30 is connected to a further quasi bi-directional port, port 1, of the microcontroller 70, and is adapted to receive and supply signals from and to the four output pins of port 1 in accordance with the required input or output operation of the devices controlled by the unit 30.

The Intel 8744 microcontroller 70 has internal EPROM which, in the present example, is not used, and therefore pin 31 is connected to a +5 volts supply. In an alternative example, the internal EPROM is used instead of the memory 27, which is omitted, the pin 31 then being connected to ground. The microcontroller 70 is operated connected together as shown.

FIG. 6 shows digital to analog converter and multiplexer 31 which in this case consists of a latch 81 and a digital to analog converter 82 with multiplexed outputs. The converter 82 has a twelve bit input supplied by the data bus 26 and four bits from the latch 81. The data bus 26 is also connected to the input pins of the latch 81 which is controlled by the WRITE command $\overline{WR}$ of the microcontroller 70. The latch 81 is an eight bit latch, and the four most significant bits of its output are used to select the output from the multiplexer 82. In operation, a first byte on the data bus 26 is latched into the latch 81 and determines the four most significant bits of the input to the converter 82 and selects one of the four outputs of the converter, and a second byte on the data bus supplies the corresponding eight least significant bits of the input to the converter 82. Operation of the converter 82 is commanded by the output OLE2 from the decoder 33.

FIG. 6 also shows part of the multiplexer and sample-and-hold circuit 34 of FIG. 2, this part being a three bit latch 83 which receives as nput the three bits A1, A2 and A3 from the address bus 27, and is clocked by the output $\overline{LG}$ from the decoder 33.

FIG. 7 shows the complete circuit 34 and the analog to digital converter 35. The circuit 34 has a multiplexer 84 and a sample-and-hold circuit 85. The multiplexer 84 has eight inputs, four from analog feedback devices in driven instrument displays, and four from the digital to analog converter and multiplexer 82, these last four being provided so that testing can be carried out. The sample and hold circuit 85 has an adjustable potentiometer arrangement 86 to allow setting of sampling parameters. Similarly, the analog to digital converter 35 is provided with adjustable resistors 87 and 88 to allow setting of conversion range and zero offset. The circuits 84, 85 and 87 are in this example an H1-508, and AD582 and a AD574A respectively. The digital to analog converter and multiplexer 82 of FIG. 5 may be an AD 390.

Operation of the sample-and-hold circuit 85 is controlled by the output signal LG from the decoder 33. Three further output signals from the decoder 33 are supplied as inputs R/C, A $\phi$ and CE to the analog to digital converter 35.

Since the analog to digital converter 35 provides a twelve bit output, this output is read in two operations, the first read obtaining the most significant eight bits, and the second read the least significant four bits plus four trailing zeros. The converter 35 is read when CE=1, R/$\overline{C}$=1 and A$\phi$=1 from the decoder 33. The decoder 33 is programmed so that R/$\overline{C}$=1 when $\overline{RD}$=0.

The circuitry shown by way of example in FIGS. 5, 6 and 7 is memory mapped within 64 kilo bytes of external memory space associated with the 8744 microcontroller. Address space decoding is performed by the decoder 33 using bits A14 and A15 of the address bus 27. The memory map is organised as follows, using hexadecimal notation: 0000 to 3FFF, applications program software; 4000 to 7FFF, even addresses for first read, odd addresses for second read with four least significant bits and four zeros; 8000 to BFFF, select or set up required feedback input; COOO to FFFF, even addresses for first write with four most significant bits and four select bits, odd addresses for second write.

The operation of selecting the next feedback input to be converted and read is carried out by applying the appropriate feedback channel address through the latch 83 to the multiplexer 84, this address being clocked into the latch 83 on a rising edge of WR applied to the decoder 33. The sample-and-hold circuit 86 is simultaneously set to sample. After the propagation delay of the multiplexer 84 and the sampling time of the sample-and-hold circuit 86 have elapsed, the sample-and-hold circuit 86 is reset to hold at the occurrence of a rising edge of $\overline{WR}$. Conversion starts immediately since the converter 35 is already set in the conversion mode by $\overline{RD}=1$.

The following is a summary of the service routines performed:

1st READ OF SELECTED FEEDBACK INPUT

8 MS bits of A-to-D conversion read

2nd READ OF SELECTED FEEDBACK INPUT

4 LS bits of A-to-D conversion read plus 4 trailing

SELECT/SETUP NEXT REQUIRED FEEDBACK INPUT

Selected feedback input held constant at A-to-D input
Commence A-to-D conversion

PROCESS RECEIVED DATA

Calculate current drive position
Calculate corresponding driving voltage
etc.

1st WRITE TO SELECTED OUTPUT

4 MS bits plus output channel select written to D-to-A

2nd WRITE TO SELECTED OUTPUT

8 LS bits written to D-to-A
D-to-A enabled
(A-to-D stops converting)

The processing of received data is carried out by the applications program software at 0000 to 3FFF of the memory space. The nature of this processing depends on the type of electromechanical display device being driven. Hence this software is chosen to be appropriate for the particular instrument module concerned, and incorporates mathematical modelling of the physical performance characteristics of the particular display device. More than one type such devices may be driven by the module, so that two or more different programs may be located in this memory space to be selected in dependence upon the device for which data is being processed at the time concerned.

Information on the Intel BITBUS system which makes use of the Intel 8044 family of microcontrollers is given in Distributed Control Modules Handbook, published in 1984 by Intel Corporation, and available from Literature Department, Intel Corporation, 3065 Bowers Avenue, Santa Clara, Calif. 95051, United States of America.

We claim:

1. An interface system for a simulated instrument display in a vehicle simulator such as a flight simulator that includes a host simulator computer, said interface system comprising:
    at least one serial bus master controller coupled to said host computer;
    a serial bus means connected to said serial bus master controller;
    at least two simulated vehicle instrument display devices, each of said simulated instrument display devices being electromechanical in operation; and
    at least one slave circuit coupled to said serial bus and said simulated instrument display devices, said slave circuit including a means to process data transmitted by said master controller in order to supply drive signals to each of said simulated instrument display devices, said slave circuit including a microcontroller with a program incorporating mathematical modelling of said predetermined physical instrument performance characteristics, said slave circuit including one or more feedback devices arranged to provide feedback signals indicative of the display, and said slave circuit including means to transmit serial data representative of the feedback signals to the master controller.

2. An interface system for simulated instruments displayed in a vehicle simulator as in claim 1, wherein said slave circuit includes:
    digital to analog conversion means for supplying analog control signals to at least one of said simulated instrument displays and to be controlled by serial data received by the bus controller; and
    analog to digital conversion means for receiving analog feedback signals from at least one of said simulated instrument display devices and supplying corresponding digital feedback signals to the bus controller to be transmitted there by serial data on the serial bus.

* * * * *